(12) United States Patent
Thau, Jr. et al.

(10) Patent No.: US 9,278,238 B2
(45) Date of Patent: Mar. 8, 2016

(54) BRACKET (75) Inventors: Lawrence W. Thau, Jr., Flemington, NJ (US); Yi Liu, Dalian (CN); Shuo Peng, Dalian (CN)

(73) Assignee: Victaulic Company, Easton, PA (US)

( * ) Notice: Subject to any disclaimer, the term of this patent is extended or adjusted under 35 U.S.C. 154(b) by 407 days.

(21) Appl. No.: 13/216,370

(22) Filed: Aug. 24, 2011

(65) Prior Publication Data
US 2013/0048822 A1 Feb. 28, 2013

(51) Int. Cl.
| | |
|---|---|
| *A62C 13/76* | (2006.01) |
| *A62C 37/50* | (2006.01) |
| *B05B 15/06* | (2006.01) |
| *A62C 35/68* | (2006.01) |
| *F16B 2/10* | (2006.01) |
| *F16L 3/24* | (2006.01) |
| *A47B 96/06* | (2006.01) |
| *E04G 3/00* | (2006.01) |
| *F16B 1/00* | (2006.01) |

(52) U.S. Cl.
CPC . *A62C 35/68* (2013.01); *F16B 2/10* (2013.01); *F16L 3/24* (2013.01)

(58) Field of Classification Search
CPC .......... A62C 35/68; F16L 3/24; F16L 3/1075; E04B 9/006; E04B 9/001; E04B 9/0428; F16M 13/02; F16M 13/022; F16M 11/10; H01Q 1/125
USPC .......... 248/65, 67.7, 72, 73, 75, 62, 373, 317, 248/316.5, 316.1
IPC   A62C 13/76, 37/50; B05B 15/06; A47B 96/06; E04G 3/00; F16B 1/00
See application file for complete search history.

(56) References Cited

U.S. PATENT DOCUMENTS

| | | | |
|---|---|---|---|
| 3,865,310 A | 2/1975 | Elkins et al. | |
| 4,436,266 A | 3/1984 | Gerding | |
| 4,717,099 A | 1/1988 | Hubbard | |
| 4,719,654 A | 1/1988 | Blessing | |
| 5,622,341 A * | 4/1997 | Stana ........................ | F16L 3/13 248/221.11 |

(Continued)

FOREIGN PATENT DOCUMENTS

| | | |
|---|---|---|
| CN | 1289396 A | 3/2001 |
| KR | 20-0440808 | 7/2008 |

OTHER PUBLICATIONS

No Author; SprinkFLEX® Flexible Sprinkler Hose Fittings, SprinkFLEX® Online catalog; No Date; website accessed Aug. 24, 2011, at http://www.sprinkflex.com; 1 page.

(Continued)

*Primary Examiner* — Jonathan Liu
*Assistant Examiner* — Muhammad Ijaz
(74) *Attorney, Agent, or Firm* — Ballard Spahr LLP (57) ABSTRACT A bracket positioned on one side of a membrane or surface is adjustable from the other side of the surface to permit the position of an item supported by the bracket to be readily adjusted relatively to the surface. The bracket has a base to which an arm is movably attached. The arm moves between an open and a closed position to permit the item to be received by the bracket. In the closed position the item is clamped between the base and the arm. A finger is mounted on the base and is movable into and out of engagement with a contact surface on the arm. When the finger engages the contact surface it secures the arm in the closed position and effects the clamping action which holds the item in position. The finger and arm are readily accessible to permit adjustment.

26 Claims, 6 Drawing Sheets

(56) References Cited

U.S. PATENT DOCUMENTS

| | | | |
|---|---|---|---|
| 5,799,907 A | 9/1998 | Andronica | |
| 5,842,526 A | 12/1998 | Archer et al. | |
| 6,138,960 A | 10/2000 | Carbonare et al. | |
| 6,260,810 B1 | 7/2001 | Choi | |
| 6,283,425 B1* | 9/2001 | Liljevik | F16M 13/02 248/218.4 |
| 6,345,800 B1 | 2/2002 | Herst et al. | |
| 6,450,465 B1* | 9/2002 | Eslick | F16B 2/10 248/230.4 |
| 6,554,231 B2 | 4/2003 | Choi | |
| 6,811,130 B1 | 11/2004 | Oh | |
| 7,255,315 B2 | 8/2007 | Oh | |
| 7,264,214 B2 | 9/2007 | Oh | |
| 7,373,720 B1 | 5/2008 | Jensen et al. | |
| 7,427,051 B2* | 9/2008 | Oh | F16L 3/24 248/72 |
| 7,506,845 B2 | 3/2009 | Oh | |
| 7,665,674 B2 | 2/2010 | Kim | |
| 7,735,787 B2* | 6/2010 | Kafenshtok | E04B 9/001 169/37 |
| 7,784,746 B2 | 8/2010 | Kafenshtok et al. | |
| 7,845,599 B2 | 12/2010 | Jackson | |
| 7,878,464 B2 | 2/2011 | Oh | |
| 8,474,199 B2* | 7/2013 | Oh | A62C 35/68 248/343 |
| 2004/0046089 A1 | 3/2004 | Kirschner | |
| 2004/0143945 A1 | 7/2004 | Christianson | |
| 2005/0139743 A1* | 6/2005 | Shim | E04B 9/006 248/342 |
| 2006/0192067 A1 | 8/2006 | Oh | |
| 2007/0063121 A1 | 3/2007 | Oh | |
| 2008/0083852 A1 | 4/2008 | Oh | |
| 2008/0083853 A1 | 4/2008 | Oh | |
| 2008/0099640 A1 | 5/2008 | Kafenshtok et al. | |
| 2008/0230238 A1 | 9/2008 | Jackson | |
| 2010/0237201 A1* | 9/2010 | Oh | B05B 15/061 248/74.2 |
| 2011/0094760 A1* | 4/2011 | Im | A62C 35/68 169/51 |
| 2011/0155865 A1* | 6/2011 | Oh | A62C 35/68 248/67.7 |
| 2011/0260012 A1* | 10/2011 | Oh | A62C 35/68 248/89 |
| 2011/0284098 A1* | 11/2011 | Silcox | A62C 35/68 137/15.18 |
| 2013/0105641 A1* | 5/2013 | Feenstra | A62C 35/68 248/75 |
| 2014/0333068 A1* | 11/2014 | Ikushima | F16B 2/10 285/409 |
| 2015/0060613 A1* | 3/2015 | Lim | A62C 35/68 248/75 |

OTHER PUBLICATIONS

No Author; Product Highlights, SprinkFLEX®, Flexible Sprinkler Hose Fittings, The Most Cost-Effective Sprinkler Drop on the Market, SprinkFLEX® Online catalog; No Date; website accessed Aug. 24, 2011, at http://www.sprinkflex.com; 2 pages.

(Copenheaver, Blaine R.) PCT International Search Report and Written Opinion regarding International Application No. PCT/US2012/044145, Sep. 13, 2012.

Henning, Mobius; Supplementary European Search Report from corresponding European patent application No. 12825156; Nov. 10, 2014; pp. 1-3; European Patent Office, Munich, Germany.

Henning, Mobius; Search Opinion from corresponding European patent application No. 12825156; Nov. 10, 2014; pp. 1-4; European Patent Office, Munich, Germany.

Author Unknown; English Translation of Office Action from corresponding Chinese patent application No. 201280040790.5; Feb. 28, 2015; pp. 1-5; State Intellectual Property Office, P.R. China.

Author Unknown; English translation of Search Report from corresponding Chinese patent application No. 201280040790.5; Feb. 28, 2015; pp. 1-3; State Intellectual Property Office, P.R. China.

* cited by examiner

BRACKET

FIELD OF THE INVENTION

The invention concerns brackets for securing items to a support.

BACKGROUND

It is often desirable to have the ability to adjust the position of an item mounted on a support by a bracket. It is advantageous if the adjustability is possible along three mutually perpendicular axes simultaneously. While the prior art discloses brackets having various degrees of adjustability, they are limited in their usefulness when a membrane or surface comes between part of the item and the bracket which supports it and limits access to the bracket; i.e., when the bracket to be adjusted is obscured behind the surface and the item projects outwardly from the surface and is accessible on the side opposite to the bracket. One example of such a situation is a ceiling mounted fire suppression sprinkler used to protect a room. The sprinkler is attached to a reducer, and the reducer is connected to a branch line of the fire suppression piping network using a flexible hose. The reducer is mounted to a support using a bracket. The support and bracket are hidden behind the ceiling surface and the sprinkler extends into the room through an opening in the ceiling. When the ceiling is drywall construction it is advantageous to be able to adjust the position of the sprinkler to align with the opening in the ceiling. Furthermore, the vertical position of the sprinkler relative to the ceiling surface must be fixed according to various codes governing such construction. Access to the bracket for adjustment is limited to the relatively small opening in the ceiling unless one wishes to enlarge the opening and later repair it, which is costly and time consuming and therefore to be avoided. Brackets according to the prior art fail to take into account the problem of limited access inhibiting adjustment when they are positioned on the inaccessible side of a membrane or surface. There is clearly a need for a bracket which affords easy adjustment to the item which its holds when access to the bracket is limited.

SUMMARY

The invention concerns a bracket for securing an item to a support. In one example embodiment the bracket comprises a base defining an opening therein for receiving the item. An arm is mounted on the base. The arm is movable between a closed position overlying the opening for retaining the item to the base, and an open position in spaced relation away from the opening to permit insertion and removal of the item into and from the opening. A contact surface is mounted on the arm. A finger is mounted on the base. The finger is movable relatively to the base so as to position it into and out of engagement with the contact surface to respectively secure the arm in the closed position and release the arm from the closed position. The finger may comprise a threaded shaft threadedly engaged with the base. Rotation of the threaded shaft moves the finger transversely to the base. The arm may be pivotally mounted on the base.

In one embodiment, the opening is defined by first and second side portions positioned in spaced relation to one another. The side portions are attached to one another by a transverse portion. The opening is positioned opposite to the transverse portion. The arm may be pivotally mounted on the first side portion, the finger being mounted on the second side portion. The arm is in facing relation with the transverse portion when the arm is in the first position overlying the opening. The finger may comprise a threaded shaft threadedly engaged with the second side portion. Rotation of the threaded shaft moves the finger transversely to the second side portion and into and out of engagement with the contact surface.

In one embodiment of the bracket, a first end of the arm is pivotally mounted on the first side portion. The contact surface comprises a tab extending from a second end of the arm oppositely disposed to the first end. The finger has a longitudinal axis. The tab is angularly oriented with respect to the longitudinal axis of the finger.

In another example embodiment of a bracket for securing an item to a support, the bracket comprises a base defining an opening therein for receiving the item. An arm is mounted on the base. The arm is movable between a closed position overlying the opening for retaining the item to the base, and an open position in spaced relation away from the opening to permit insertion and removal of the item into and from the opening. A contact surface is mounted on the arm. A finger is mounted on the base. The finger has a longitudinal axis and is movable in a direction along the axis relatively to the base into and out of engagement with the contact surface to respectively secure the arm in the closed position and release the arm from the closed position.

In another example embodiment of a bracket for securing an item to a support, the bracket comprises a base defining an opening therein for receiving the item. An arm is mounted on the base. The arm is movable between a closed position overlying the opening for retaining the item to the base, and an open position in spaced relation away from the opening to permit insertion and removal of the item into and from the opening. A contact surface mounted on the base. A finger is mounted on the arm. The finger is movable relatively to the arm into and out of engagement with the contact surface to respectively secure the arm in the first position and release the arm from the first position.

DETAILED DESCRIPTION

Figure 1:
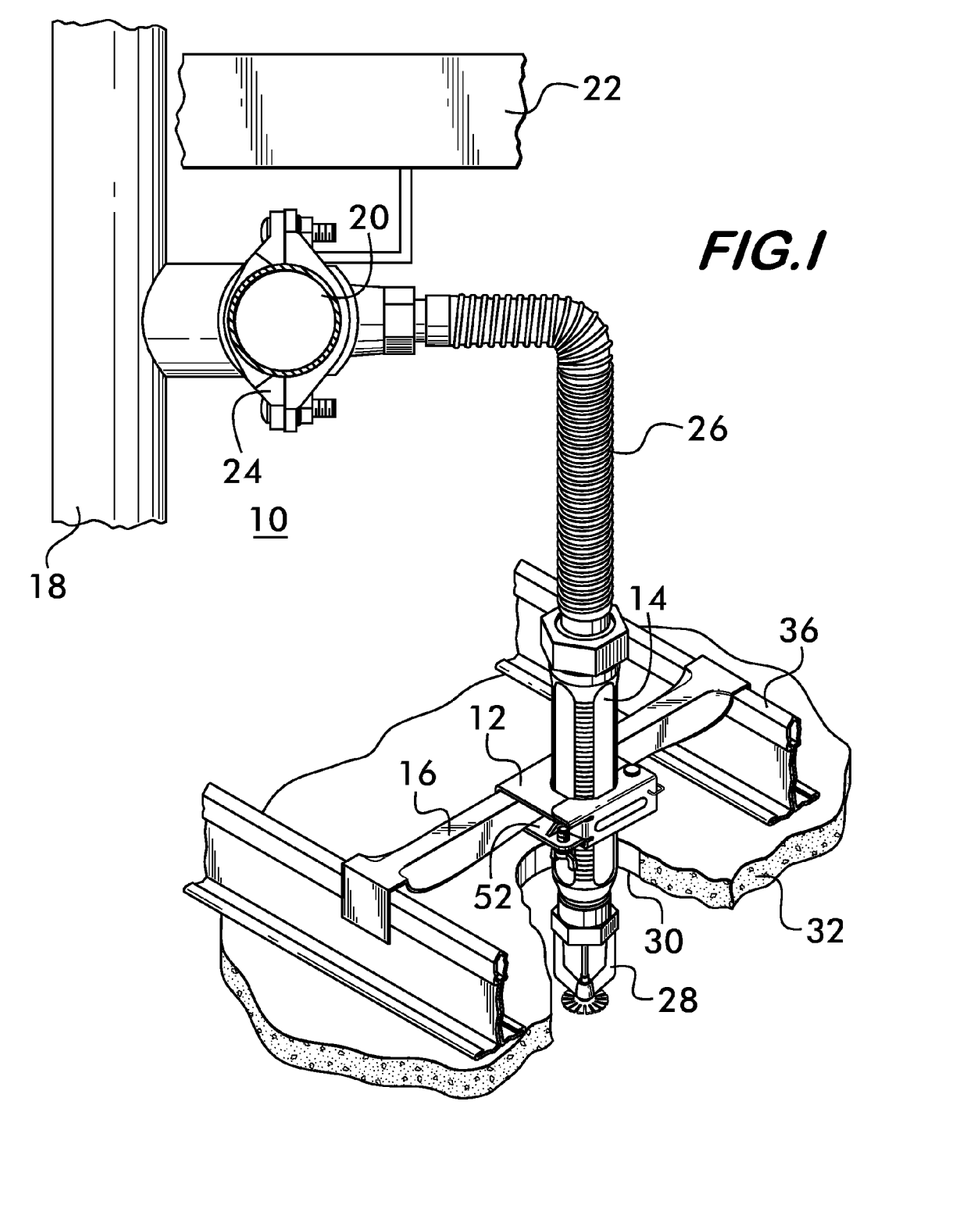
FIG. 1 is an isometric view of a bracket used in an assembly to secure an item to a support.

FIG. 1 shows an example assembly 10 wherein an example bracket 12 according to the invention is used to secure an item 14 to a support 16. In this example, the assembly 10 is a fire suppression sprinkler system comprising a riser 18 and a branch pipe 20 attached to a beam 22 of a structure, such as a warehouse, office building, hotel or other edifice. A saddle coupling 24 connects one end of a flexible hose 26 to the pipe 20, the other end being attached to the item 14, in this example a sprinkler reducer. Sprinkler reducer 14 is connected to a heat triggered sprinkler 28 which projects through an opening 30 in a ceiling panel 32. The weight of the flexible hose 26, bracket 12, reducer 14 and sprinkler 28 is borne on the support 16, in this example a cross beam which extends between rails 36 to which the ceiling panel 32 is attached. In this example the ceiling panel is drywall construction, but other types of ceilings are also contemplated.

Use of the flexible hose 26 permits positional adjustment of the sprinkler 28 in two horizontal and one vertical direction, making it advantageous for use with drywall construction because it is very easy to align the sprinkler with the opening 30. Vertical positioning of the sprinkler is facilitated by the bracket 12. An example bracket 12 is shown in detail in FIG. 2 and comprises a base 38, an arm 40 mounted on the base, a contact surface 42 mounted on the arm and a finger 44 mounted on the base.

Figures 2, 2A, 2B, 2C:
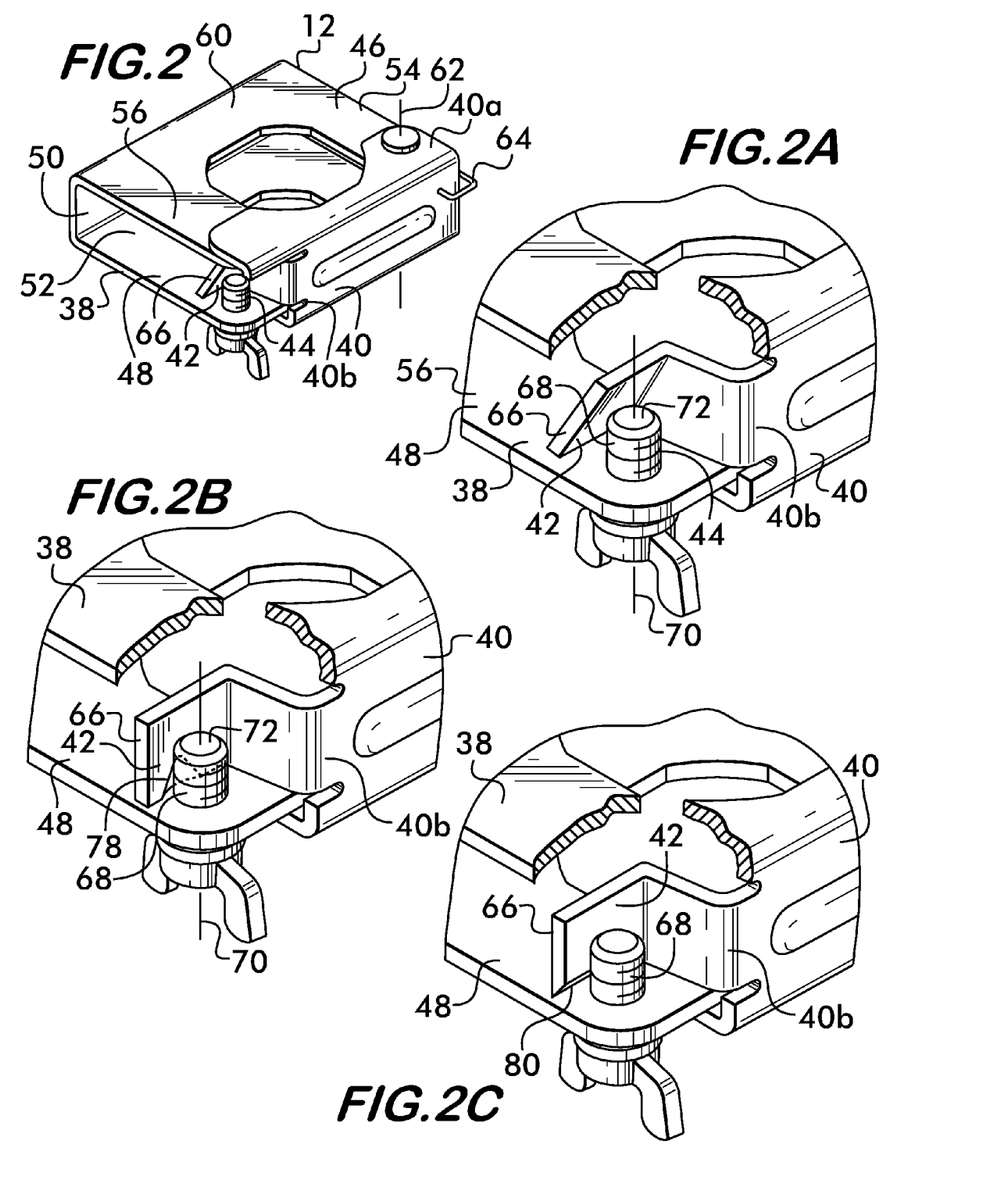
FIG. 2 is an isometric view of an example bracket according to the invention shown in a closed configuration.
FIG. 2A is a partial cut-away isometric view of a portion of the bracket shown in FIG. 2 on an enlarged scale.
FIGS. 2B and 2C are partial cut-away isometric views of additional example embodiments of brackets according to the invention.

In this example, base 38 is formed of first and second plates 46 and 48 positioned in spaced apart relation to one another. Plates 46 and 48 are attached to one another by a third plate 50. Together plates 46, 48 and 50 form a channel 52 which in this example is sized to receive the support, cross beam 16 (see FIG. 1) to mount the bracket 12 onto it. Alternately, the base 38 could be bolted or riveted to the cross beam or another support using one of the plates, however, receiving the cross beam 16 within channel 52 permits easy positional adjustment of the sprinkler 28 lengthwise along the beam.

Figure 3:
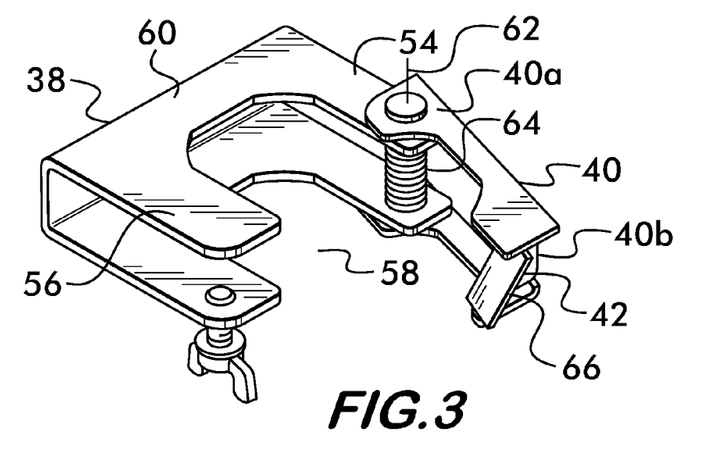
FIG. 3 is an isometric view of the example bracket shown in FIG. 2, but in an open configuration.

As shown in FIGS. 2 and 3, base 38 has first and second side portions 54 and 56 in spaced relation to one another thereby defining an opening 58 (FIG. 3) which receives the item 14 to be mounted on support 16. The side portions are connected by a transverse portion 60, the opening 58 being positioned opposite to the transverse portion.

Figures 5, 6, 7:
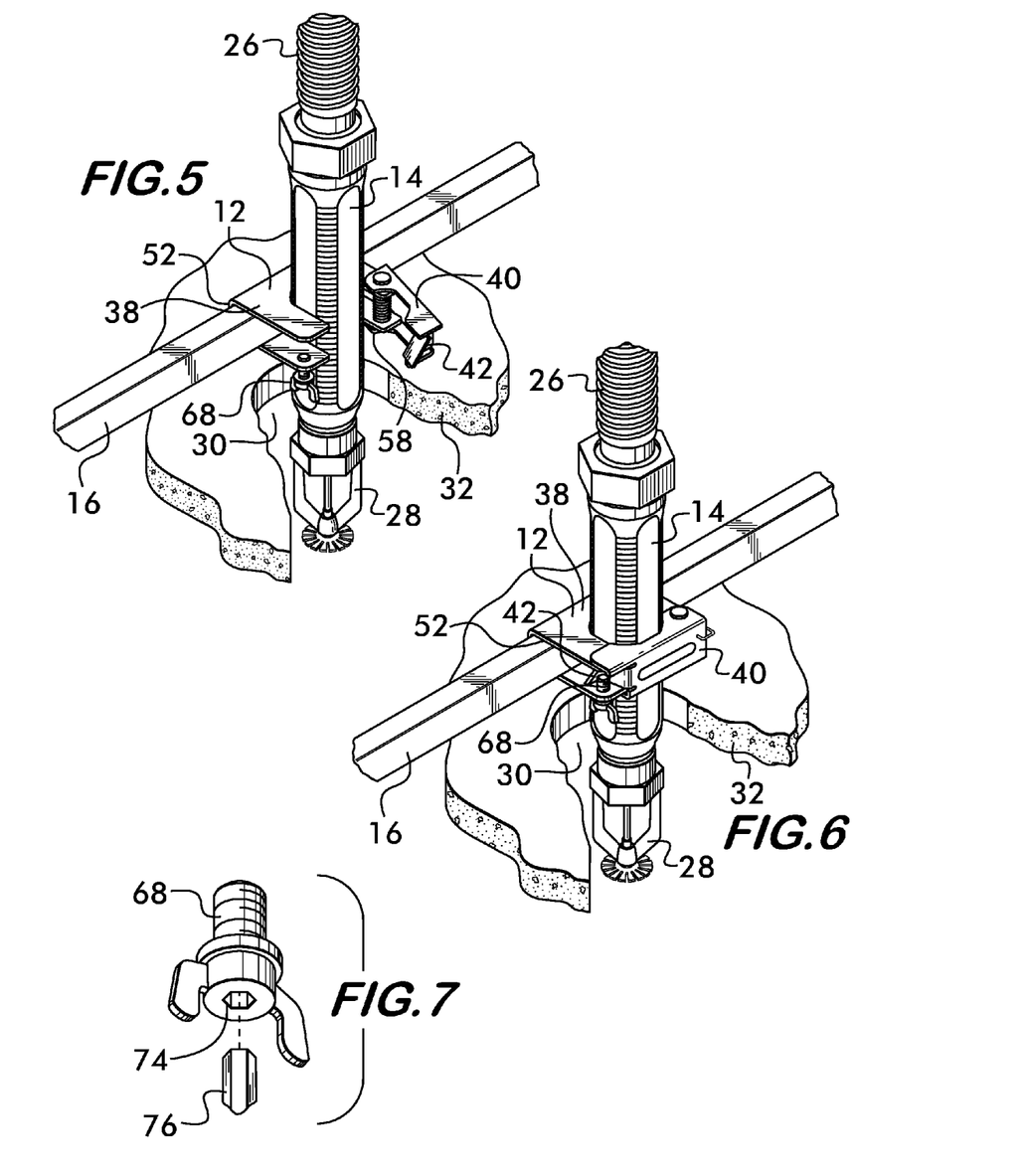
FIGS. 5 and 6 show an example bracket embodiment in use.
FIG. 7 is an isometric view of a component of the bracket shown in FIGS. 5 and 6 on an enlarged scale.

FIGS. 2 and 3 illustrate the arm 40. In this example, a first end 40a of arm 40 is pivotally mounted on the first side portion 54. Arm 40 can pivot about an axis 62 between a closed position overlying opening 58 (FIG. 2), and an open position in spaced relation away from the opening (FIG. 3). There may be a spring element 64 acting between the base and the arm which biases the arm 40 into the closed position overlying the opening. Contact surface 42 comprises a tab 66 in this example, the tab extending from a second end 40b of the arm 40 disposed opposite to the first end 40a. FIG. 2A illustrates the tab 66 and finger 44 in detail. In this example finger 44 comprises a threaded shaft 68 which threadedly engages the second base plate 48 on the second side portion 56. Shaft 68 has a longitudinal axis 70 and is movable in the direction of axis 70 transversely to the base 38 when rotated to permit the end 72 of the shaft 68 to move into and out of engagement with the contact surface 42. Shaft 68 may be a wing bolt to facilitate manual rotation, and/or it may have a non-round receptacle 74, as shown in FIG. 7, to permit a tool 76, such as a nut driver or hex head wrench, to be used for rotating the shaft 68.

In one example embodiment, shown in FIG. 2A, the tab 66 is angularly oriented with respect to the longitudinal axis 70 of the shaft 68. Angularly orienting tab 66 permits the force exerted by the shaft 68 on the second end of arm 40b to be varied as necessary to clamp the item 14 between the arm 40 and the base 38 as shown in FIGS. 5 and 6 and described below. Other tab configurations which achieve a clamping force between the arm and the base are also feasible. As shown in FIG. 2B, the tab 66 is aligned substantially parallel with the longitudinal axis 70 of the shaft 68, and has a recess 78 which receives the end 72 of the shaft 68 and permits the arm 40 to be forced tightly into the closed first position as the shaft is rotated and driven along the recess and against the contact surface 42. FIG. 2C shows a tab 66 having a beveled edge 80 for receiving and guiding the shaft into engagement with the contact surface 42 of the tab. In both of these embodiments it is advantageous if the tab 66 partially overlies the path of shaft 68 when the arm 40 is held in the closed position by the spring 64 so that when the shaft 68 engages the contact surface 42 of the tab 66 it applies force to the arm thereby allowing the arm to exert a clamping force on the item 14 positioned between it and the base 38.

Figure 2D:
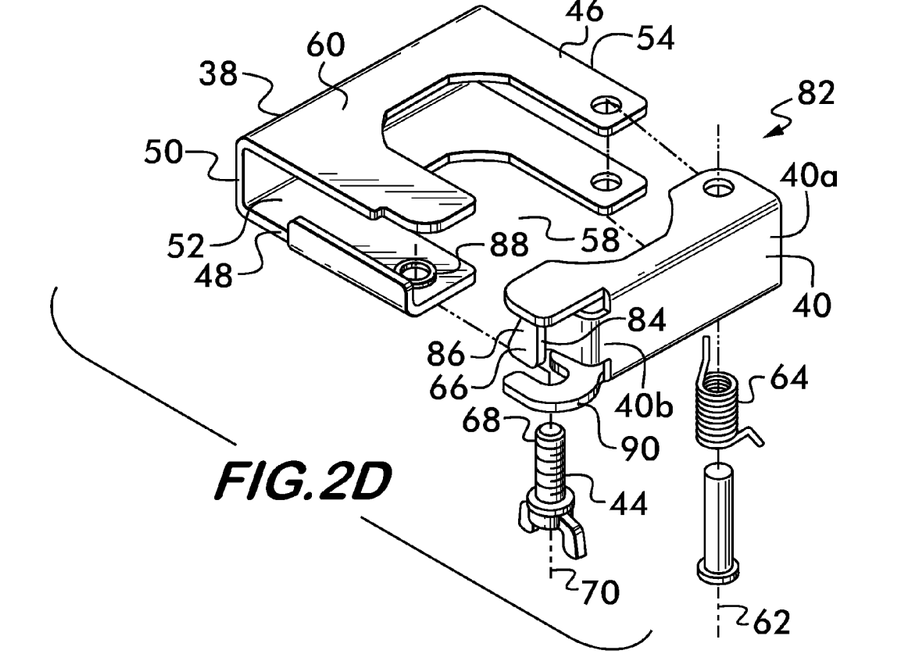
FIG. 2D is an exploded isometric view of another example embodiment of a bracket according to the invention.

FIG. 2D shows an exploded view of another bracket embodiment 82 wherein tab 66 comprises a curved surface 84 forming a hook 86. Hook 86 is sized to receive finger 44 when the arm 40 is in the closed configuration overlying opening 30. Curved surface 84 may have a conical shape, being wider at the end proximate to the position 88 on base 38 where the finger 44 engages the base, and narrowing distally therefrom. The conical shape helps guide the finger into engagement with the surface 84 by forming a lead-in to accept the end of the finger 44. The conical shape also provides an effect similar to the angled contact surface 42 shown in FIG. 2A in that it permits the finger to force the arm 40 into the closed position as it rides up the surface 84 upon motion along axis 70.

As further shown in FIG. 2D, a hook 90 is mounted on the second end 40b of arm 40. Hook 90 is sized to receive finger 44 and helps to properly position arm 40 in the closed position to permit effective engagement between the finger 44 and the curved surface 84 of tab 66.

Figures 4, 4A, 4B, 4C:
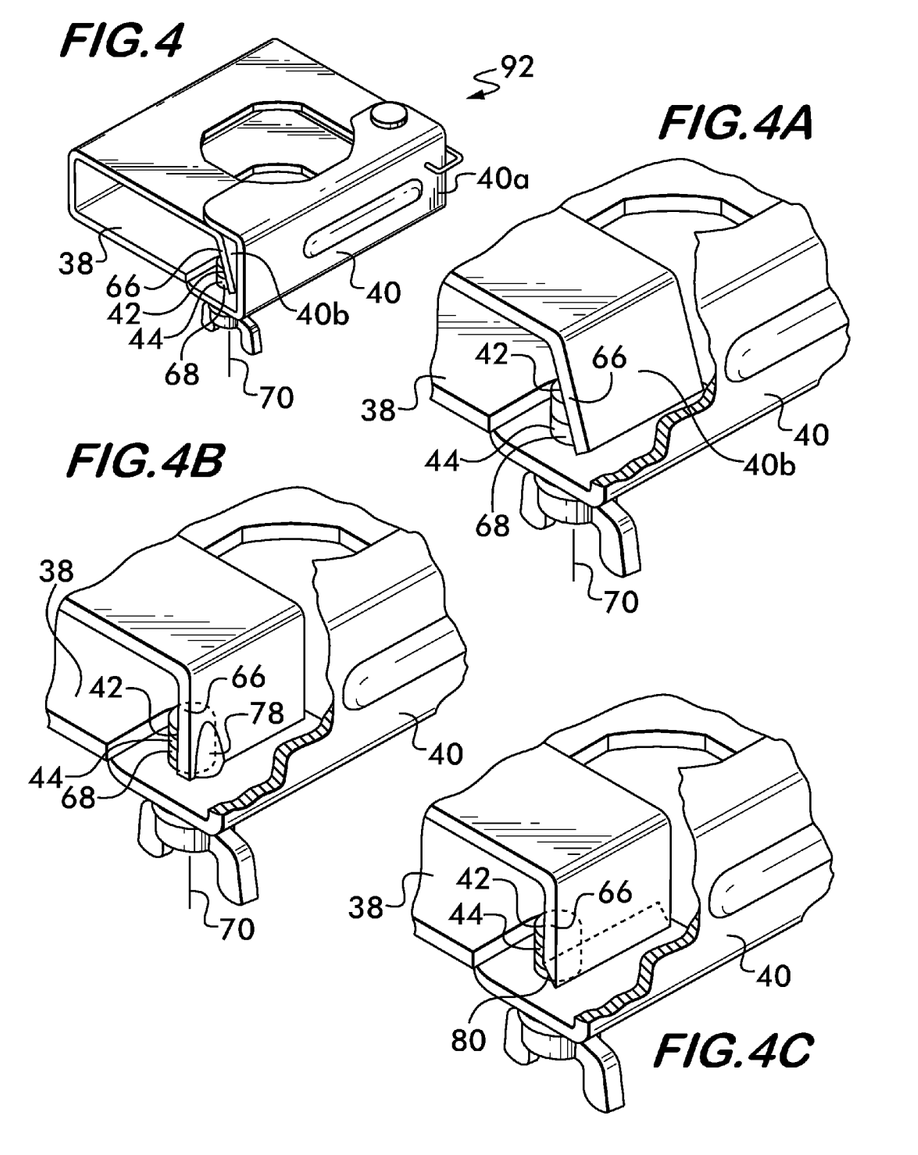
FIG. 4 is an isometric view of an example bracket according to the invention shown in a closed position.
FIG. 4A is a partial cut-away isometric view of a portion of the bracket shown in FIG. 4 on an enlarged scale.
FIGS. 4B, 4C and 4D are partial cut-away isometric views of additional example embodiments of brackets according to the invention.

FIG. 4 shows an alternate bracket embodiment 92 wherein finger 44 is mounted on arm 40, and the contact surface 42 is mounted on the base 38, the other features of the bracket 82 being as described above for bracket 12. In the example bracket 92, finger 44 comprises a threaded shaft 68 threadedly engaged with the end 40b of arm 40. Shaft 68 has a longitudinal axis 70, and rotation of the shaft moves the finger transversely to the arm 40 in the direction of the axis 70, allowing the shaft to engage and disengage with the contact surface 42. Contact surface 42 comprises a tab 66 mounted on the second plate 48. As shown in FIG. 4A, tab 66 may be angularly oriented with respect to the longitudinal axis 70 of the shaft 68.

Figure 4D:
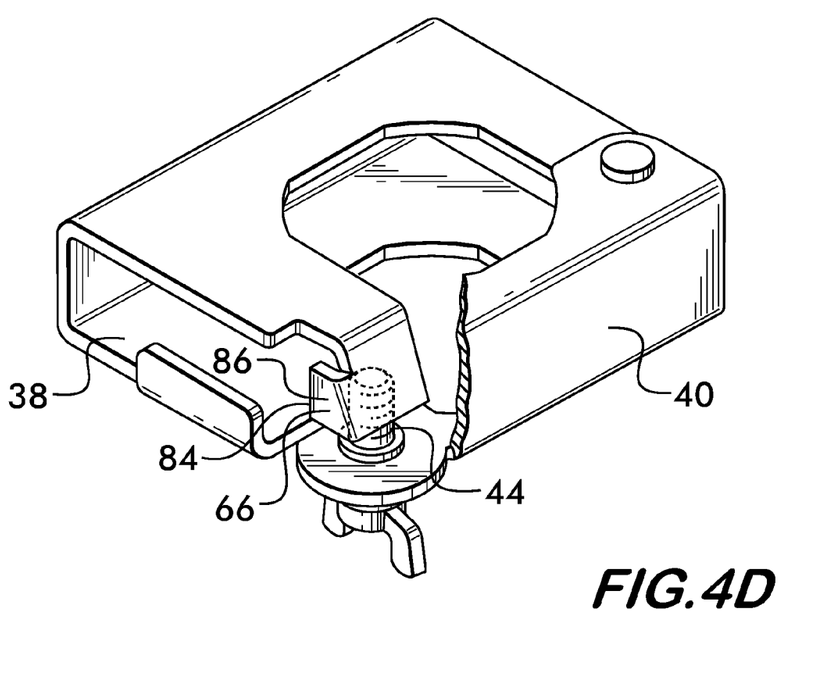

In another embodiment, shown in FIG. 4B, tab 66 is mounted on base 38 and comprises a recess 78 which receives and guides finger 44 (shaft 68) into engagement with the contact surface 42. Finger 44 is mounted on arm 40 and movable along its longitudinal axis 70 as described above. FIG. 4C illustrates another embodiment wherein finger 44 is again mounted on arm 40 and tab 66 is mounted on base 38, the tab having a beveled edge 80 to guide the finger into engagement with the contact surface 42. FIG. 4D illustrates yet another embodiment wherein finger 44 is mounted on arm 40 and the tab 66 comprises a curved surface 84 forming a hook 86 mounted on the base 38. Hook 86 is sized to receive finger 44 when the arm 40 is in the closed configuration overlying opening 30. Curved surface 84 may have a conical shape, being wider at the end proximate to the end of the finger 44, and narrowing distally therefrom. The conical shape helps guide the finger into engagement with the surface 84 by forming a lead-in to accept the end of the finger 44. The conical shape also provides an effect similar to the angled contact surface 42 shown in FIG. 2A in that it permits the finger to force the arm 40 into the closed position as it rides up the surface 84 upon motion along axis 70.

Operation of the bracket 12 according to the invention is illustrated in FIGS. 5 and 6. In this example, before a ceiling panel 32 is installed, support 16 is received within channel 52 and the bracket 12 is able to slide lengthwise along the support so as to preposition it to align with opening 30 in the ceiling panel once it is installed. Item 14, in this example a sprinkler reducer attached to a piping network by a flexible hose 26 (see also FIG. 1), is inserted within bracket opening 58 (FIG. 5) and held in position by moving arm 40 (or allowing the arm to move if spring biased) from the open to the closed position (FIG. 6). With the arm 40 in the closed position, threaded shaft 68 is rotated to engage it with contact surface 42 and provide clamping force between the arm 40 and the bracket base 38 to clamp the reducer in an arbitrary vertical position. Next the ceiling panel 32 is attached to its supporting structure (see rails 36 in FIG. 1), with the opening 30 aligned with the reducer 14. After installation of the ceiling panel 32, a technician may adjust the vertical position of the sprinkler 28 attached to the reducer 14 by turning the threaded shaft 68 to disengage it from the contact surface 42, thereby allowing the arm 40 to swing from the closed to the open position (FIG. 5), or at least out of contact with the reducer 14. The reducer, no longer being supported by bracket 12, is free to move vertically as necessary to position the sprinkler 28 at the desired position relative to the ceiling panel 32. The technician holds the reducer in the desired vertical position and moves, or allows, arm 40 to move back into the closed position (FIG. 6) where it engages the reducer. The technician then rotates the threaded shaft 68 to again engage it with the contact surface 42, which results in clamping of the reducer between the arm 40 and the base 38, thereby holding the sprinkler in the desired vertical position.

Brackets according to the invention allow easy adjustment of the position of an item on one side of a barrier or membrane where the mounting to be manipulated is positioned on the opposite side of the barrier or membrane and thereby provide significant advantage over prior art mounting brackets. Although use of example brackets according to the invention is shown in the context of a fire suppression sprinkler system, it is understood that this is by way of example only and not a limitation. Brackets according to the invention may be used with any type of support, in a ceiling, wall or other structure, and in any orientation, and may be used to secure electrical fixtures such as lighting, wiring harnesses, natural gas lines, audio components such as loudspeakers, as well as safety devices such as smoke detectors, carbon monoxide detectors, and radiation monitors to cite but a few examples.

What is claimed is:

1. A bracket for securing an item to a support, said bracket comprising:
a base defining an opening therein for receiving said item;
an arm, mounted on said base, said arm being movable between a closed position overlying said opening for retaining said item to said base, and an open position in spaced relation away from said opening to permit insertion and removal of said item into and from said opening;
a contact surface mounted on said arm;
a finger having a longitudinal axis, said finger mounted directly on said base when said arm is in both said open and closed positions, said finger being movable along said longitudinal axis relatively to said base so as to position at least a portion of said finger into and out of engagement with said contact surface and exert a force against said contact surface along said longitudinal axis, said contact surface being angularly oriented with respect to said longitudinal axis and redirecting a portion of said force in a direction perpendicular to said longitudinal axis to achieve a clamping force between said arm and said base to respectively secure said arm in said closed position and release said arm from said closed position.

2. The bracket according to claim 1, wherein said arm is pivotally mounted on said base.

3. The bracket according to claim 2, further comprising a spring mounted between said base and said arm, said spring biasing said arm into said closed position overlying said opening.

4. The bracket according to claim 1, wherein said opening is defined by first and second side portions positioned in spaced relation to one another, said side portions being attached to one another by a transverse portion, said opening being positioned opposite to said transverse portion.

5. The bracket according to claim 4, wherein said arm is pivotally mounted on said first side portion, said finger being mounted on said second side portion, said arm being in facing relation with said transverse portion when in said closed position overlying said opening.

6. The bracket according to claim 5, wherein said finger is threadedly engaged with said second side portion, rotation of said threaded shaft moving said finger transversely to said second side portion and into and out of engagement with said contact surface.

7. The bracket according to claim 4, wherein a first end of said arm is pivotally mounted on said first side portion, said contact surface comprising a tab extending from a second end of said arm oppositely disposed to said first end.

8. The bracket according to claim 7, wherein said contact surface comprises a recess positioned within said tab for receiving said finger.

9. The bracket according to claim 7, wherein said contact surface comprises a beveled edge positioned on said tab for receiving said finger.

10. The bracket according to claim 7, wherein said tab comprises a curved surface forming a hook for receiving said finger.

11. The bracket according to claim 7, wherein said contact surface comprises a curved surface having a conical shape positioned on said tab.

12. The bracket according to claim 7, further comprising a hook mounted on said second end of said arm, said hook being sized to receive said finger.

13. The bracket according to claim 1, wherein said base comprises:
a first plate;
a second plate facing said first plate and positioned in spaced apart relation thereto;
a third plate positioned opposite to and facing said opening, said third plate attached to said first and second plates to form a channel for receiving said support.

14. The bracket according to claim 1, wherein said finger comprises a threaded shaft threadedly engaged with said base, rotation of said threaded shaft moving said finger transversely to said base.

15. A bracket for securing an item to a support, said bracket comprising:
a base defining an opening therein for receiving said item;
an arm, mounted on said base, said arm being movable between a closed position overlying said opening for retaining said item to said base, and an open position in spaced relation away from said opening to permit insertion and removal of said item into and from said opening;

a contact surface mounted on said base;

a finger having a longitudinal axis, said finger mounted directly on said arm when said arm is in both said open and closed positions, said finger being movable relatively to said arm into and out of engagement with said contact surface so as to exert a force against said contact surface along said longitudinal axis, said contact surface being angularly oriented with respect to said longitudinal axis and redirecting a portion of said force in a direction perpendicular to said longitudinal axis to achieve a clamping force between said arm and said base to respectively secure said arm in said closed position and release said arm from said closed position.

16. The bracket according to claim 15, wherein said arm is pivotally mounted on said base.

17. The bracket according to claim 16, further comprising a spring mounted between said base and said arm, said spring biasing said arm into said closed position overlying said opening.

18. The bracket according to claim 15, wherein said opening is defined by first and second side portions positioned in spaced relation to one another, said side portions being attached to one another by a transverse portion, said opening being positioned opposite to said transverse portion.

19. The bracket according to claim 18, wherein said arm is pivotally mounted on said first side portion, said contact surface comprising a tab projecting from said second side portion, said arm being in facing relation with said transverse portion when said arm is in said closed position overlying said opening.

20. The bracket according to claim 19, wherein said finger comprises a threaded shaft threadedly engaged with said arm, rotation of said threaded shaft moving said finger relatively to said arm and into and out of engagement with said tab.

21. The bracket according to claim 20, wherein a first end of said arm is pivotally mounted on said first side portion, said finger comprising a threaded shaft threadedly engaged with a second end of said arm oppositely disposed to said first end, rotation of said threaded shaft moving said finger transversely to said arm and into and out of engagement with said tab.

22. The bracket according to claim 19, wherein said contact surface comprises a recess positioned within said tab for receiving said finger.

23. The bracket according to claim 19, wherein said contact surface comprises a beveled edge positioned on said tab for receiving said finger.

24. The bracket according to claim 19, wherein said tab comprises a curved surface forming a hook for receiving said finger.

25. The bracket according to claim 19, wherein said contact surface comprises a curved surface having a conical shape positioned on said tab.

26. The bracket according to claim 15, wherein said base comprises:

a first plate;

a second plate facing said first plate and positioned in spaced apart relation thereto;

a third plate positioned opposite to and facing said opening, said third plate being attached to said first and second plates to form a channel for receiving said support.

\* \* \* \* \*